US007756325B2

(12) United States Patent
Vetter et al.

(10) Patent No.: US 7,756,325 B2
(45) Date of Patent: Jul. 13, 2010

(54) ESTIMATING 3D SHAPE AND TEXTURE OF A 3D OBJECT BASED ON A 2D IMAGE OF THE 3D OBJECT

(75) Inventors: Thomas Vetter, Basel (CH); Sami Romdhani, Saint-Louis (FR); Jean-Sebastian Pierrard, Gundelfingen (DE)

(73) Assignee: University of Basel (CH)

( * ) Notice: Subject to any disclaimer, the term of this patent is extended or adjusted under 35 U.S.C. 154(b) by 946 days.

(21) Appl. No.: 11/425,252

(22) Filed: Jun. 20, 2006

(65) Prior Publication Data

US 2007/0031028 A1 Feb. 8, 2007

Related U.S. Application Data

(60) Provisional application No. 60/691,795, filed on Jun. 20, 2005.

(51) Int. Cl.
*G06K 9/00* (2006.01)

(52) U.S. Cl. ........................ 382/154; 345/419; 345/441; 348/51; 382/103; 382/118; 382/277; 382/294

(58) Field of Classification Search .................. 345/419, 345/427, 441, 646; 348/42, 51; 382/103, 382/118, 128, 154, 277, 284, 294
See application file for complete search history.

(56) References Cited

U.S. PATENT DOCUMENTS 6,556,196 B1 * 4/2003 Blanz et al. ................. 345/419

| | | | | |
|---|---|---|---|---|
| 6,975,750 B2 * | 12/2005 | Yan et al. | ..................... | 382/118 |
| 7,057,614 B2 * | 6/2006 | Akatsuka et al. | ............ | 345/427 |
| 7,184,071 B2 * | 2/2007 | Chellappa et al. | ............. | 348/46 |
| 7,315,643 B2 * | 1/2008 | Sakamoto et al. | ........... | 382/154 |
| 7,561,732 B1 * | 7/2009 | Owechko et al. | ............ | 382/154 |
| 2003/0160786 A1 * | 8/2003 | Johnson | ...................... | 345/419 |
| 2004/0197015 A1 * | 10/2004 | Fan et al. | ..................... | 382/128 |
| 2007/0031028 A1 * | 2/2007 | Vetter et al. | .................. | 382/154 |
| 2008/0069445 A1 * | 3/2008 | Weber | ......................... | 382/181 |

OTHER PUBLICATIONS

S. Romdhani, Face Image analysis uing multiple features fitting strategy, 2005, pp. 1-13.*
S. Romdhani, Face Recognition USing 3-D Models: Pose Illumination, Nov. 2006, IEEE vol. 94, No. 11, pp. 1977-1999.*
Peter N. Belhumeur & David J. Kriegman, What Is the Set of Images of an Object under All Possible Illumination Conditions? International Journal of Computer Vision, vol. No. 28, Issue No. 3, 1-16 (1998).

(Continued)

*Primary Examiner*—Gregory M Desire
(74) *Attorney, Agent, or Firm*—Joyce von Natzmer; Pequignot + Myers LLC (57) ABSTRACT

Disclosed is an improved algorithm for estimating the 3D shape of a 3-dimensional object, such as a human face, based on information retrieved from a single photograph by recovering parameters of a 3-dimensional model and methods and systems using the same. Beside the pixel intensity, the invention uses various image features in a multi-features fitting algorithm (MFF) that has a wider radius of convergence and a higher level of precision and provides thereby better results.

30 Claims, 9 Drawing Sheets

OTHER PUBLICATIONS

Paul J. Besl, A method for Registration of 3-D Shapes, IEEE Transactions on Pattern Analysis and Machine Intelligence, vol. 14, Issue 2 (Feb. 1992).

Volker Blanz and Thomas Vetter, Face Recognition Based on Fitting a 3D Morphable Model, IEEE Transactions on Pattern Analysis and Machine Intelligence, vol. 25, Issue 9 (Sep. 2003).

Volker Blanz and Thomas Vetter, A Morphable Model for the Synthesis of 3D Faces, SIGGRAPH 99, 1999.

G. Borgefors; Hierarchical chamfer matching: A parametric edge matching algorithm; IEEE Trans. Pattern Anal. Mach. Intell., 10(6): 849-865, 1988.

P. Felzenszwalb and D. Huttenlocher; Distance transforms of sampled functions; Technical Report TR2004-1963, Cornell Computing and Information Science, 2004.

A. Fitzgibbon; Robust registration of 2d and 3d point sets, Proc. British Machine Vision Conference, vol. 2, pp. 411-420, 2001.

C. Rother, V. Kolmogorov, and A. Blake. Grabcut—interactive foreground extraction using iterated graph cuts, Proc. ACM Siggraph, 2004.

Sami Romdhani and Thomas Vetter, Efficient, Robust and Accurate Fitting of a 3D Morphable Model, Proceedings of the IEEE International Conference on Computer Vision 2003.

A. Shashua; On photometric issues in 3d visual recognition from a single 2d image. Int. J. Computer Vision; 21:99-122, 1997.

T. Sim, S. Baker, and M. Bsat; The cmu pose, illumination and expression (pie) database of human faces, Technical report, CMU, 2000.

Vetter, T. and Blanz, V., Estimating Coloured 3D Face Models from Single Images: An Example Based Approach, Proceedings: Computer Vision ECCV'98—Freiburg, Germany, pp. 499-513, Springer, LNCS 1407.

J. Xiao, S. Baker, I. Matthews, R. Gross, and T. Kanade; Real-time combined 2d+3d active appearance model, Proceedings IEEE Conf. on Computer Vision and Pattern Recognition, pp. 535-542, 2004.

* cited by examiner

ESTIMATING 3D SHAPE AND TEXTURE OF A 3D OBJECT BASED ON A 2D IMAGE OF THE 3D OBJECT

CROSS REFERENCE TO RELATED APPLICATIONS

This application claims the benefit of U.S. provisional application No. 60/691,795, filed Jun. 20, 2005, which is incorporated herein by reference in its entirety.

FIELD OF THE INVENTION

This invention relates to a method for estimating the 3-dimensional (3D) shape of a 3-dimensional object, such as a human face, from a single image by recovering parameters for a 3D Model. Furthermore, the invention relates to an image processing system for implementing such a method.

BACKGROUND OF THE INVENTION

US6556196, Blanz et al., is directed to a method of processing an image of a three-dimensional object. The method provides a morphable object model derived from a plurality of 3D images. By matching the morphable object model to at least one 2D object image it is possible to provide a matched morphable object model as a 3D representation of the object shown on the 2D object image. To provide a morphable object model a 3D database comprising a plurality of 3D images of prototype objects is generated. The data of the 3D database is then processed by a data processing facility by which correspondences between the prototype objects and at least one reference object are determined. The morphable object model represents a set of objects comprising linear combinations of the shapes and textures of the prototype objects.

The publications including patents referred to herein and/or used herein to illustrate the invention and, in particular, to provide additional details respecting the practice are incorporated by reference. For convenience, non-patent publications are referred to herein by numerals and listed in the appended "List of References."

The present disclosure refers at different places to aims of the invention. As the person skilled in the art will appreciate, not every claimed embodiment will address all such aims. In fact, the person skilled in the art will appreciate that some embodiments will address several, one or none of the aims stated herein

SUMMARY OF THE INVENTION

The present invention is directed to an improved algorithm which is suitable to estimate the 3D shape and/or the texture (e.g. albedo sampled densely over the object surface) and/or the imaging condition (illumination conditions and pose, i.e. imaging device position relative to the object) of a 3-dimensional object, such as a human face, based on information retrieved from a single photograph by recovering parameters of a 3-dimensional model, preferably a 3-dimensional Generalized Flexible 3D Object Model.

Today available algorithms, which are tackling the problem of 3D shape estimation from image data, use only the pixels intensity as input to perform an estimation process, which often provides relatively poor results. Several attempts have been made to estimate the shape of a 3-dimensional object. From prior art a relatively simple model is known as the Lambertian reflectance model leading to a linear fitting algorithm. Alternatively, a more precise model has been used minimizing a non-convex cost function with many local minima. One way to reduce the local minima problem is to use a stochastic optimization algorithm. However, the convergence properties (such as the radius of convergence) of such algorithms are limited.

Beside the pixel intensity, the herein disclosed invention preferably uses, depending on the field of application, various image features such as information about edges or location of the specular highlights. In an embodiment of the invention the 3D shape, texture and imaging parameters are estimated by maximizing the posterior of the parameters given these image features. One advantage consists in that by the present invention the overall cost function obtained is smoother and, hence, a stochastic optimization algorithm is in general not needed to avoid the local minima problem inherent to the approaches known from prior art. A multi-features fitting algorithm (MFF) according to the present invention has a wider radius of convergence and a higher level of precision and provides better results.

Estimating the 3D shape of an object from 2D image data is a central problem of computer vision. One aim of the invention is to recover the 3D shape of a 3-dimensional object, such as a human face, from a single 2-dimensional (2D) image of the 3-dimensional object without additional information such as its texture, albedo (measure of reflectivity of a surface or body), its pose and the illumination environment.

As a pixel value in general depends on the above-mentioned attributes, accurately estimating the 3D shape requires recovering its texture and the imaging conditions as well. Separating the contributions of light and albedo of the pixel intensity from a single image of the object is an ill-posed problem and requires a model of variations of the 3D shape, texture, and reflectance and a prior on its parameters. The present invention is based on a 3-dimensional model, preferably a Generalized Flexible 3D Object Model (GF3DOM), in which 3-dimensional shapes and textures are represented as a linear combination of shapes and textures principal components.

GF3DOM are known since a long time (see reference [15], cited above). These linear combinations are performed in a vector space of shapes and textures in which all 3D shapes and RGB textures vertices are in correspondence with a reference. The correspondence between instances of a class of object is a fundamental principle of accurate modelling of 3-dimensional Linear Object Class and is described e.g. in document [13] mentioned in the list of references. In order to recover the 3D shape and texture from a 2D image, it is necessary to estimate the correspondences between the 2D input image and a 3D model.

The illumination is modelled in general by a Phong reflection model and one light source, which can take into account the diffuse component, the specular highlights as well as the attached and cast shadows. A Stochastic Newton Optimization algorithm, as described in document [4] of the list of references, fits the GF3DOM to a single image thereby estimating the 3D shape, the texture and the imaging conditions. One drawback of the fitting algorithm used in conjunction with GF3DOM known from the prior art consists in that the correspondence is estimated from the 3D shape, the texture and the imaging conditions from pixel intensity only. As a result, the energy function, or cost function, used for minimization is highly non-convex and comprises many local minima. To avoid this drawback the present invention is directed to an improved fitting algorithm which avoids the problem inherent to the fitting algorithm known from prior art. The fitting algorithm according to the present invention is directed to a Multi-Features Fitting (MFF) algorithm that uses not only information related to the pixel intensity but also other image related information (cues), such as the edge or specular highlight information (see FIG. 1). The resulting cost function is, compared to the cost function known from the prior art, much smoother and easier to minimize, making the system more robust and reliable. To adjust (fuse) the different image related information to form the optimal parameter in a preferred embodiment a Bayesian framework is used to maximize the posterior probability of the parameters given by the image and its features.

The problem of estimating the 3D shape of an object from a 2D image is also addressed in the context of shape-from-shading, in which, usually, a Lambertian reflectance model is applied, which ignores both attached and cast shadows as well as specular highlights. When the light direction and the texture are not known, several images are required to estimate the shape. However, if the pose is fixed and the light direction varies, three images are necessary, when ignoring the attached and cast shadows. For further information see list of cited references document [11]. When the attached shadows are considered, Belhumeur and Kriegman (see list of cited references [1]) showed that the set of all N pixels images of an object at constant pose lies in a N-dimensional subspace, however, seven images were used to estimate the shape of a human face in order to obtain good recognition results. Common drawbacks of these photometric approaches consist in that they use a simple reflectance model treating the cast and attached shadowed pixels, which do convey substantial information, as outlier and they require multiple images of the same object to estimate the shape owing to the simple image model that they rely on. The image model used with the herein disclosed invention is more complex and includes a prior on the shape, on the texture and a more general reflectance model, enabling the estimation from a single image.

In document [14], mentioned in the list of cited references, an algorithm estimating the 3D shape of a face human from a single image is disclosed whereby a 2D Active Appearance Model (AAM) is fitted and the resulting shape is constrained as being a valid 2D projection of a 3D shape modeled by a 3-dimensional morphable model (3DMM). It was demonstrated that a 2D AAM is capable of instantiating the projection of any 3D shape in the span of a 3DMM, at the expense of using up to six times more parameters. They showed good fitting results obtained on the same individual used to train the 2D AAM. However, the accuracy of the recovered depth is questionable as the lighting is not estimated and hence the shading, which conveys most of the depth information in an image, is not explicitly employed.

In difference to the prior art, one aim of the present invention is to present a method able to estimate the 3D shape and/or texture and/or imaging conditions e.g. of a human face by registering a single 2D image of said face to a 3-dimensional Model, preferably a GF3DOM. Thereby the GF3DOM is a correspondence-based model such as introduced in document [13] mentioned in the list of cited references, and detailed in document [15] of the list of cited references. The invention is explained from now on at the example of a human face and in connection with a 3-dimensional Generalized Flexible 3D Object Model (GF3DOM).

One aim of the herein presented invention is not only to estimate the 3D shape of a 3D-object but also to provide the possibility of estimate texture (e.g. albedo sampled densely over the object surface) and imaging condition (illumination conditions and pose, i.e. imaging device position relative to the object). A preferred method according to the present invention is suitable for estimating object properties, such as 3D shape and texture, and imaging conditions (the way the object is illuminated and the imaging device position relative to the object) from data acquired by an imaging device, such as e.g. a still digital camera, a video digital camera, a 2D image scanner, or a 3D (image) scanner, by recovering model parameters to adjust a 3-dimensional model of the 3-dimensional object from one or multiple views of the object acquired by one or many of the aforementioned devices by a Multiple-Feature Fitting algorithm. Such a method comprises in general the following steps:

a) retrieving several image related informations from the 2-dimensional image;

b) processing the retrieved informations separately by specific cost functions;

c) superimposing the results of the specific cost functions in the Multi-Feature Fitting Algorithm;

d) approaching a global extreme of the Multi-Feature Cost Function by adjusting model parameters related to the Multi-Feature Fitting Algorithm;

e) using the model parameters in the 3-dimensional model to display a 3-dimensional estimation of the 3-dimensional shape.

In a GF3DOM model in which the 3-dimensional shape and texture e.g. of several faces of several individuals are represented in a reference frame (u, v). A vertex of the reference frame represents the same facial feature across all faces instantiated by the model. The shape and texture are each modeled by a PCA space. The pose and illumination variations are determined by using available computer graphics techniques, such as the Phong reflectance model. Using a dense sampling of the reference frame, photorealistic renderings are retrieved typically from model parameters by warping an illuminated texture $t^c$ to the image frame using the inverse shape projection that maps the image frame to the reference frame: $I^m(x,y;\theta)=t^c(u,v;\theta) \circ p^{-1}(x,y;\theta)$ (equation 1).

A fitting algorithm that estimates the 3-dimensional shape and texture of a human face from a single 2D image relatively accurately, is a Stochastic Newton Optimization (SNO) algorithm as described in document [4] (see cited list of references). The algorithm often converges to a minimum close enough to the global minimum, such that the recovered shape and texture approximate well those of the individual shown on the 2D input image. However, in many cases, it converges to a local minimum far from the global one, yielding to an unrealistic result (see FIG. 2).

Therefore one aim of the herein discussed invention is to provide a fitting algorithm that is more robust, especially with respect to the local minima problem in that a stronger classifier is constructed from multiple weaker classifiers.

A fitting algorithm using multiple features aims at maximising the posterior probability of the model parameters given not only the input image, as it is done in the SNO (see document [4] cited in the list of references), but also different features of it. To make the notations more readable, the posterior probability is derived using two features, $f^1$ and $f^2$., and making their dependence on the input image I implicit. Using the Bayes rule and denoting by $\theta$ the ensemble of model parameters, the following equation is obtained, assuming that the features are independent:

$$p(\theta|f^1, f^2) = \frac{p(f^1|\theta) \cdot p(f^2|\theta) \cdot p(\theta)}{p(f^1) \cdot p(f^2)} \quad \text{(equation 2)}$$

The aim of the herein disclosed MFF algorithm is to maximise the above equation with respect to the model parameters θ.

By using deterministic algorithms for the feature extraction, the equation is simplified to:

$$p(\theta|f^1, f^2) = p(f^1|\theta) \cdot p(f^2|\theta) \cdot p(\theta) \qquad \text{(equation 3)}$$

Maximising this equation is equivalent to minimising the negative of its logarithm:

$$-\ln p(\theta|f^1, f^2) = -\ln p(f^1|\theta) - \ln p(f^2|\theta) - \ln p(\theta) \qquad \text{(equation 4)}$$

The negative of the logarithm of a probability function is called from now on a cost function which is to be minimized. As a result, the above shown equation says that if the features are independent and deterministic, maximizing their joint posterior probability is equivalent to minimizing the sum of their cost functions. The use of combined classifiers, in the Pattern classification field, stems from the fact that each classifier has different strengths and their combination maximises the overall performances. For example, an optimal cascaded classifier is constructed with a chain of classifiers such as the classifier i achieves its maximum discrimination on the Patterns that are poorly discriminated by the first i-1 classifiers, see document [10] in list of cited references. Similarly, for the fitting problem the local minima of the features cost functions should be located in different areas of the parameter space. Then, the combination of the multiple cost functions would have fewer local minima and a smoother behaviour on the parameter space (see FIG. 3).

Several aspects of a preferred embodiment of the invention are described in more detail according to the following figures. The figures are showing in a schematic and simplified manner:

DESCRIPTION OF VARIOUS AND PREFERRED EMBODIMENTS

In the following sections embodiments of cost functions for several features are exemplary shown. Cost functions for pixel intensity, edge features, specular highlight features and texture constraints features are described.

Example of a cost function for pixel intensity: Fitting the intensity of the pixels aims to recover the correspondence, the 3D shape, the texture, and the imaging parameters, by matching the colour of the model image to the colour of the input face image. Hence, the feature used to fit the pixel colour, $f^c$, is simply an input image: $f^c(I(x,y)) = I(x,y)$ If the pixels are assumed independent and identically distributed with a Gaussian probability, the pixel intensity cost function is given by:

$$-\ln p(I(x,y)|\theta) \propto \frac{1}{2} \sum_i (I(x_i, y_i) - I^m(x_i, y_i))^2 \qquad \text{(equation 6)}$$

The cost function $C^c$ can then be written as the inner product of the error vector $e^c$:

$$C^c = \frac{1}{2} e^{cT} \cdot e^c \qquad \text{(equation 7)}$$

with $$e_i^c = I(x_i, y_i) - t^c(u, v; \theta) op^{-1}(x_i, y_i; \theta)$$

Composing this last equation on its right with the forward shape mapping $p(u,v;\theta)$ [16] using the shape composition axiom [16], and sampling the reference frame instead of the image frame, yields a cost function that depends on the forward shape mapping:

$$e_i^c = I(x,y) op(u_i, v_i; \theta) - t(u_i, v_i; \theta) \qquad \text{(equation 8)}$$

The SNO algorithm minimizes the sum of this cost function and a cost function that depends on the prior. Unfortunately, this former cost function is perturbed by many local minima (example see FIG. 4) that plots values of the pixel intensity cost function obtained by varying the azimuth angle around its global optimum and using average values of the other model parameters.

Representing a shape in the GF3DOM requires putting it in correspondence with a reference frame. Its depth is then estimated using the shading recovered from the pixel intensity by estimation of 1) the texture (using the prior model) and 2) the lighting environment. In the SNO algorithm, the pixel intensity feature is used to recover both the correspondence and the shading. As the shading depends directly on the pixel intensity, it is reasonable to estimate it from the pixel intensity feature. However, the correspondences are implicit in the cost function of Equation 4, this feature is, then, not optimal to evaluate them.

Example of a cost function for edge features: In general image edges provide information about the 2D shape independently of the texture and of the illumination. Hence, the cost function used to fit the edge features provides a more direct constraint on the shape and pose parameters. This is why its plot, shown in FIG. 5, across azimuth direction is much smoother compared to the FIG. 4. Edge features are useful to recover correspondences of specific facial characteristics such as eyes, eyebrows, mouth and nose. Unfortunately, this former cost function is perturbed by many local minima. See, for example, FIG. 4 that plots values of the pixel intensity cost function obtained by varying the azimuth angle around its global optimum and using average values of the other model parameters.

The edge feature is defined as the binary edge map given by, for instance, a canny edge detector [6]: $f^e(I(x,y)) = \text{canny}(I(x,y))$. If the image edge pixels are independent and identically normally distributed over the image, then the edge feature cost function is given by the following equation:

$$\ln p(f^e(I)|\theta) \propto C^e = e^{eT} \cdot e^e \qquad \text{(equation 9)},$$

with $$e_i^e(\theta) = \|q_{k(i)}^e - p_i(\theta)\|$$

where $q_{k(i)}^e$ is the is the 2D position of an image edge pixel in correspondence with the model edge point whose index is i and that is projected in the image frame to $p_i$ with $i=1, \ldots, N_e$ where $N_e$ is the number of model edge points. The mapping between the image and the model edge points is denoted by k(i). To estimate it, we use the same rule as the Iterative Closest Point (ICP) algorithm [2]: The model edge point i is set in correspondence with the input image edge point, $q_j^e$, closest to it:

$$k(i) = \arg\min_{j=1,K,J} \|q_{k(i)}^e - p_i\| \quad \text{(equation 10)}$$

where J is the number of image edge points.

Similar to the ICP algorithm, fitting the edge involves, at each iteration, the following two steps: First, the correspondence mapping, k(i), is computed. Then, given this mapping, the model parameters are updated to reduce the cost function of Equation (9). However, performing these two steps separately is not optimal, as modifying k(i) alters the minimum. Hence, it is desirable, to update k(i) along with the parameters θ. Levenberg-Marquardt ICP (LM-ICP) is an algorithm, proposed by Fitzgibbon [8], addressing this problem. The difference between the Fitzgibbon algorithm and the one according to the present invention is that in [8], only rigid parameters were estimated. Whereby in the described embodiment not only rigid but also the non-rigid parameters are calculated.

The trick is to use the Chamfer Distance Transform (CDT) [5]. It is defined as the mapping D(x) that associates a point of the image space, x, with the distance to the closest edge point:

$$D(x) = \min_{j=1,\ldots,J} \|q_j^e - x\|. \quad \text{(equation 11)}$$

The CDT at the image point, x, in essence, incorporates two pieces of information: The closest edge point to x (which, according to the ICP algorithm, is set in correspondence with x); and the distance between these two points. Hence, it replaces both the mapping k(i) and the distance $\|q_{k(i)}^e - p_i\|$. As a result, using the CDT, the edge cost function is transformed to: $e_i^e(\theta) = D(p_i(\theta))$ (equation 12).

The edge cost function is computed simply by sampling the CDT at the position where the edge model points are projected under the shape and projection parameters.

Note that the CDT depends only on the input image, not on the model parameters. Hence it can be computed only once, at the beginning of the fitting algorithm. An efficient implementation of the computation of D(x) is proposed in [7], see list of cited references, whose complexity is O(2wh), where w and h are the width and height of the input image.

Differentiating the edge cost function of Equation (12), with respect to a model parameter $\theta_j$, is straightforward and yields:

$$\frac{\partial e_i^e}{\partial \theta_j} = \frac{\partial D}{\partial x}(p_i) \cdot \frac{\partial p_i^x}{\partial \theta_j} + \frac{\partial D}{\partial y}(p_i) \cdot \frac{\partial p_i^y}{\partial \theta_j}. \quad \text{(equation 13)}$$

The advantage of the LM-ICP algorithm is that the derivatives of the CDT encode both the derivative of the mapping function k(i) and the one of the distance between corresponding points. As opposed to the ICP algorithm, in which the derivatives do not depend on the mapping and hence regard it as being constant for each update of the parameters. As a result, in the LM-ICP algorithm, used here, the parameter update takes into account the variation of the mapping function. This is the reason why this scheme is called 'soft correspondence'.

The cost function of equation 9 depends on the model edge points pi, with $1, \ldots, N_e$ which form a subset of the model vertices. Two types of model edges are distinguished herein: First, textured edges which result from a texture change in the inner part of a face and delimit facial features such as the lips, eyes and eyebrows. Second, contour edges which are defined by points that are on a border between a face area and a non-face area in an image plane.

The location of the textured edges is constant on the reference frame. As the reference frame is densely sampled by 3D vertices, the textured edges form a constant subset of model vertices. The subset of model vertices chosen as textured edges is shown in white on the texture map of the average head in FIG. 6.

Figure 7:
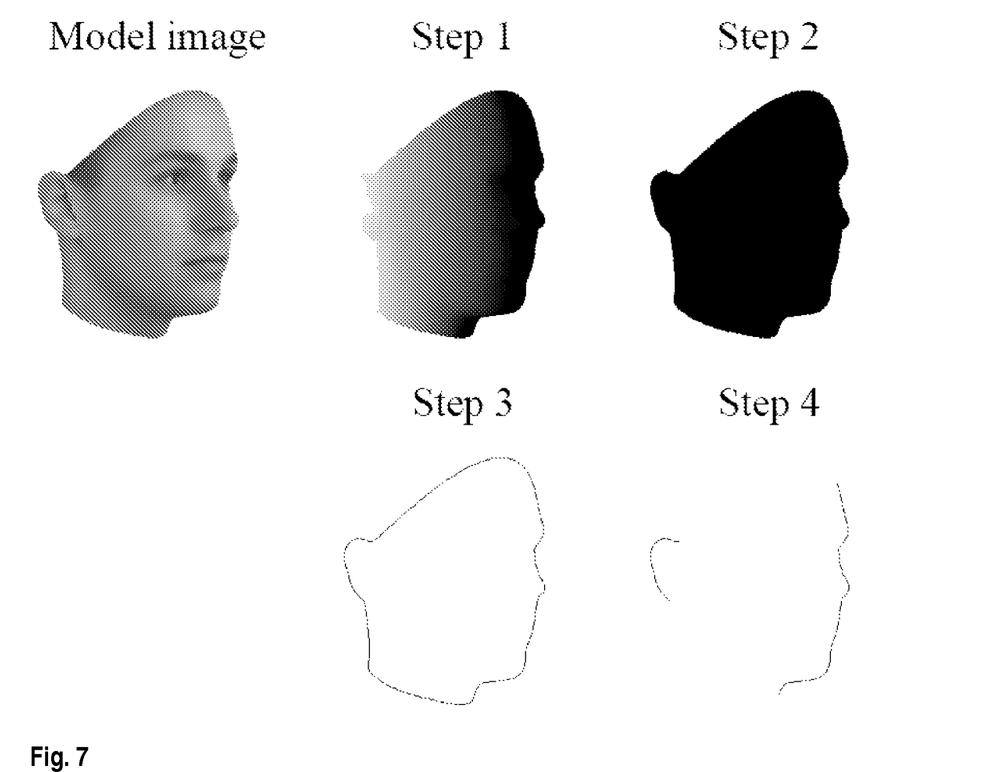
FIG. 7 shows steps for selecting of model contour edges.

As opposed to the textured edges, the contour edges do depend on the rigid parameters. The fitting of contour edges proceeds in two steps: First, the model vertices on the contour for the current rigid parameters are selected, then these vertices are fitted to the input edges in the same way as for textured edges, i.e. using the CDT. The selection of model contour edges is performed by the following algorithm that includes four step whose results, on an example image, are shown in FIG. 7:

1. Vertex map: First the vertex map is constructed. A vertex map is a rendering of the face, but instead of setting the R, G, B color at one pixel, a vertex index is set. The vertex whose index is set at one pixel, is the one that is projected nearest to this pixel.

2. Binary vertex map: The vertex map is converted to a binary format by thresholding the vertex map to one. The binary vertex map has, hence, a value of one for any pixel in the face area of the image, and zero, for any pixel outside the face area.

3. Erosion and subtraction: The morphological operation of erosion is applied to the binary vertex map, using as structuring element a disk of radius of one pixel. Then this eroded binary image is subtracted to the binary vertex map obtained at step 2. The resulting binary image is the contour map. Each pixel on this contour map set to one is on the contour of the face. Sampling the vertex map (obtained at step 1) on these pixels yields the indexes of the model vertexes on the contour.

4. Contour vertex indexes: The GF3DOM does not model the entire skull. It only models the points ranging from one ear to the other and from the top of the forehead to the neck. As a result, some parts of its contour, on the lower part of the neck and on the top of the fore head, are artificial. These artificial contour points are removed at this step. The good news is that this artificial contour is present always in the same area of the face. Hence, it is constant. Thus, a list of the vertex indexes on the artificial contour can be made, and all the contour vertex indexes yielded by step 3 that are on the artificial contour list are removed. This step yields the indexes of the contour vertex used for fitting.

Specular Highlighting Feature: The specular highlights are easy to detect: The pixels with a specular highlight saturate. Additionally, they give a direct relationship between the 3D geometry of the surface at these points, the camera direction, and the light direction: A point on a specular highlight has a normal that has the direction of the bisector of the angle formed by the light source direction and the camera direction (see FIG. 8).

Figure 9:
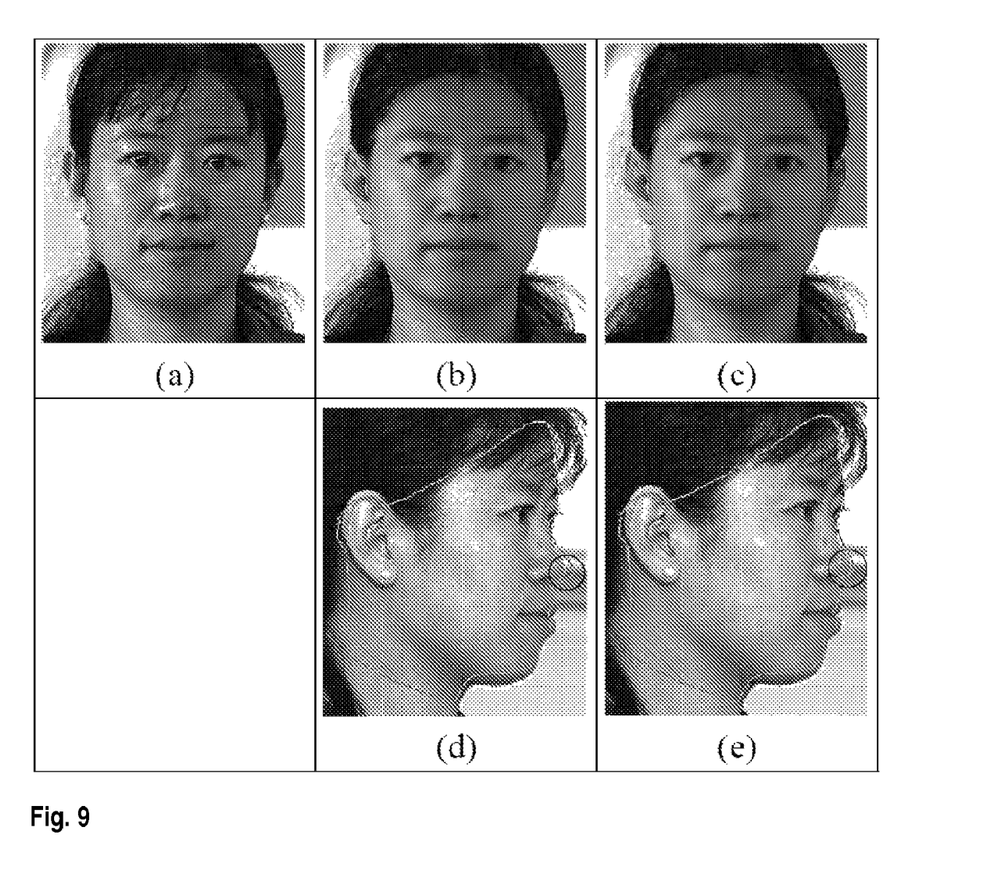
FIG. 9 is a comparison of fitting results with and without specular highlight feature.

The benefit of the specular highlight feature is shown on an example on FIG. 9. Image (a) presents an input image (at a frontal pose) with a specular highlight on the left of the tip of the nose. Two fittings of this photograph are performed. The first one without the specular highlight feature (second column) and the second one using this feature (third column). Renderings of these two fittings at a frontal pose (top row) appear to be similar. Renderings of the contour at a profile view (using the fitted parameters of the top row) are shown on the bottom row. It is clearly apparent that the tip of the nose is much closer to the ground truth on the fitting result obtained with the specular highlight feature. To sum up, the specular highlight feature provide additional depth information improving the 3D shape estimation.

A point on a specular highlight as a normal equal to:

$$n(\theta) = \frac{r+l}{\|r+l\|} = \frac{v(\theta)+l}{\|v(\theta)+l\|} \quad \text{(equation 14)}$$

where r is the reflection vector, which, for a point on the specular highlight, has the same direction as the viewing vector $v(\theta)$, that connects the point to the camera, and l is the light direction. Hence, we define the specular highlight cost function as follows:

$$C^s = e^{sT} \cdot e^s \quad \text{(equation 15),}$$

with $$e_i^s = n_i(\theta) - (v_i(\theta)+l)$$

where $e_i^s$ is a three elements sub-vector of $e^s$; $n_i$ and $v_i$ are, respectively, the normal and the viewing vector of the vertex i i that is projected on a pixel on a specular highlight.

Gaussian Prior Feature: The GF3DOM is based on a Gaussian probability model for both the 3D shape and the RGB texture. In the model construction, a PCA is applied to diagonalize the shape and texture covariance matrices. Hence the cost function of the prior feature is as follows:

$$C^p = \sum_i \frac{\alpha_i^2}{\sigma_{S,i}^2} + \sum_i \frac{\beta_i^2}{\sigma_{T,i}^2} \quad \text{(equation 16)}$$

where $\alpha_i$ and $\beta_i$ are the shape and texture PCA coefficients (i.e. they are elements of the vector $\theta$); $\sigma_{S,i}$ and $\sigma_{T,i}$ are, respectively, their standard deviations. This prior term is also used in the SNO fitting algorithm [4].

Texture constraint feature: In order to accurately estimate the 3D shape, it is required to recover the texture, the light direction and its intensity. To separate the contribution of the texture from light in a pixel intensity value, a texture prior model is used (see previous section). However, it appears that this prior model is not restrictive enough and is able to instantiate invalid textures. To constraint the texture model and to improve the separation of light from albedo, we introduce a feature that constraints the range of valid albedo values.

Figure 10:
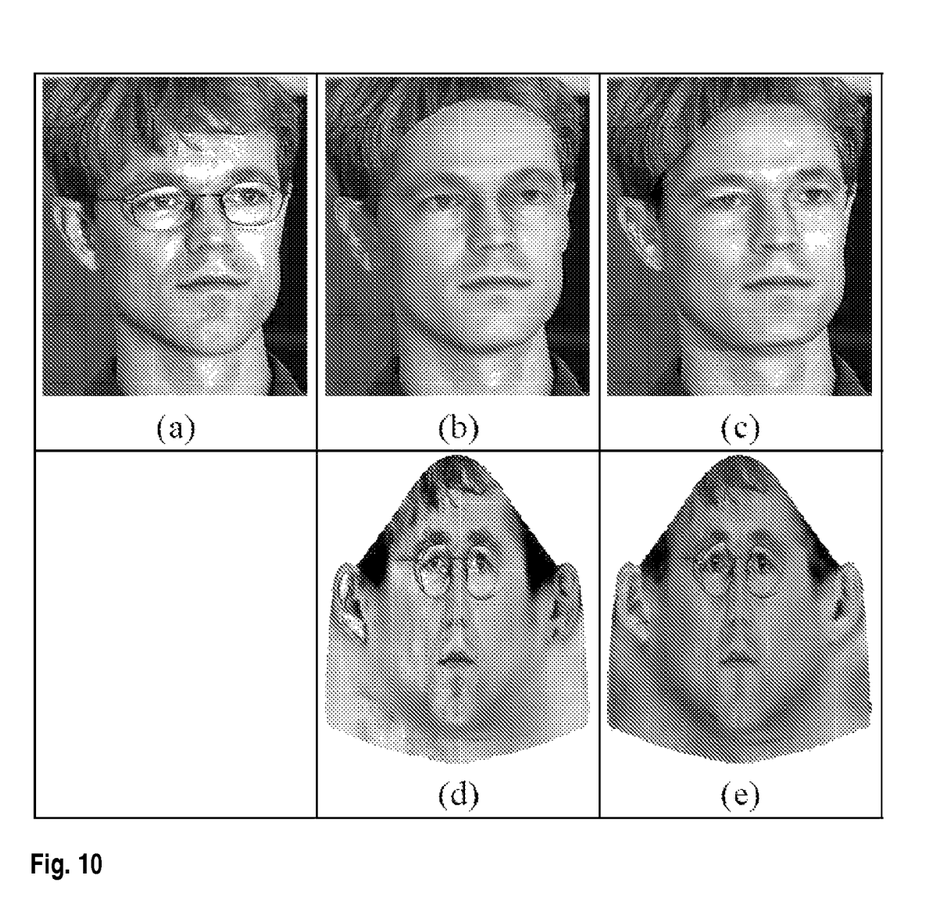
FIG. 10 is a comparison of fitting results with and without texture constraint feature.

An example is presented in FIG. 10. The second column shows a poor fitting where the light intensity is underestimated and the texture over-estimated. As these effects compensate each other, the fitting result rendered in image (b) look plausible. However when the texture from the image is extracted and the illumination inverted, the result is affected by some bluish regions that look unnatural (image (d)). The process of texture extraction and inverse illumination, which is required to perform a re-rendering of a photograph in novel conditions.

The valid intensity range of a pixel is [0, 255]. This constraint is not enforced by the Gaussian prior texture model. Imposing a valid range over all the texture points make the texture less likely to be over-estimated, as in the second column of FIG. 10, and hence, make the light intensity less likely to be under-estimated. The results shown in the third column of the same figure are obtained by imposing, during fitting, the model color to be in the range [5, 250]. This is achieved by using the following cost function:

$$C^t = \frac{1}{2} e^{tT} \cdot e^t, \quad \text{(equation 17)}$$

with $$e_i^t = \begin{cases} t_i(\theta) - l & \text{if } t_1(\theta) < l \\ 0 & \text{if } l \le t_i(\theta) \le u, \\ t_i(\theta) - u & \text{if } t_i(\theta) > u \end{cases}$$

where $t_i(\theta)$ is the color intensity of a channel of a model vertex used for fitting, and l and u are the lower and upper bounds of the valid intensity range. Note that this feature is not a hard constraint, but is rather a soft constraint, whose influence on the resulting estimate is relative to the other features.

Multi Feature Fitting Algorithm: Equation (4) says that when the features are independent and deterministic, maximizing the posterior of the model parameter is equivalent to minimizing the sum of the negative likelihoods. As the negative likelihood of a feature is proportional to the feature cost function, the overall cost function is a linear combination of the features cost functions:

$$\min_\theta \tau^c C^c + \tau^e C^e + \tau^s C^s + \tau^p C^p + \tau^t C^t. \quad \text{(equation 18)}$$

In this function, the r's are the feature weighting factors. It is here minimized using a Levenberg-Marquardt optimization algorithm as described in list of references [9]. Similarly to the SNO algorithm, the fitting is initialized using a set of five to seven (depending on the pose) manually set anchor points located e.g. at the eyes corners, nose tip, mouth corners and on the contour. Standard initial values of the shape, texture, illumination and rigid parameters are used (average shape and texture, frontal pose and one frontal directed light).

A Matlab implementation of the MFF Fitting algorithm requires, on average, 70 seconds to reach convergence on a 3.0 GHz Intel Pentium IV computer. On the other hand, the SNO algorithm requires 4.5 minute on a 2.0 GHz computer.

Improved Fitting using an Outlier Map: The major source of fitting inaccuracies e.g. in a facial image is the presence of outlying pixels. An outlying pixel, or outlier, is a pixel inside the face area of an image whose value cannot be predicted by the model nor by the noise distribution assumed by the fitting cost function (it is assumed that the noise is independent and identically distributed over all pixels of the image with a normal distribution.). Typical examples of outliers are glasses, specular highlight due to the presence of glasses, and occluding objects such as facial hair. Naturally, a black pixel due to facial hair may be predicted by the model, but doing so, would substantially modify the model parameters and deteriorate the fitting of the rest of the face (see top row images of FIG. 11). Thus, fitting an outlier is prejudicial not only because the fitted model parameter would account for an artefact such as hair but also because it would substantially decrease the overall quality of the fitting in the outlier-free region of the face. Discarding all pixels with a large residual is not a general solution to this problem: Some inliers may have a large fitting error and discarding them would jeopardize the quality of the fitting. This may happen at the beginning of the fitting algorithm when there is an important lack of correspondence. For instance, the model pupil may overlap the skinny area between the eye and the eyebrows inducing a large residual. It is this residual which is to drive the model parameters to improve the correspondence and, hence, it should not be down-weighted.

To appreciate the importance of this problem, the fitting of the same image was performed with the outlier pixels discarded. To do so, an outlier mask is generated automatically. The mask is shown on the first image of the bottom row of FIG. 11: The brighter pixels are treated as outliers and are not sampled in the sum of the energy function of Equation 18. The visual quality of the reconstruction yielded by this fitting, shown on the middle of the bottom row of the figure, is improved. The rendering of the novel view (last column) is also superior when the outlier is excluded.

An outlier mask can be automatically produced e.g. by the following procedure:
1. Perform a coarse fitting without outlier mask, but with a large weight on the prior probability ($\tau^P$ increased in Equation 18). Only a few iterations of the fitting algorithm are necessary at this stage. A rendering of the result of this fitting is shown on the first image of FIG. 12. This procedure provides a rough estimate of the pose and shape of the face in the input image. Exploiting the dense correspondence of the Generalized Flexible 3D Object Model, it is possible that every point in the 3D model can be mapped to its approximate position in the image.
2. Select several (e.g. five) image patches in the face area. The image patches are located at constant positions in the GF3DOM, and manually selected on the cheek area of the face; they are shown on the second image of FIG. 12. The purpose of the first fitting is to get the position of these patches on the input image.
3. These image patches are in the herein described example used to initialize a GrabCut algorithm, developed by Rother et al [17], that segments the skin region (relevant region) from the non-skin part (non-relevant region) of the image, thereby producing the outlier mask. GrabCut is an image segmentation algorithm that combines colour and contrast information together with a strong prior on region coherence. Foreground and background regions are estimated by solving a graph cut algorithm.

Identification: The MFF algorithm was experimented using the light portion of the CMU-PIE facial image database, as described in document [12] of the reference list, that includes 22 different illumination conditions at three poses (front, side and profile) for 68 individuals. Several identification experiments, using one image per individual at a side view as the gallery, and a cosine-based distance measure between shape and texture model parameters, were performed. Averaging all these experiments over the probe sets (one probe set includes photographs taken at one of the 3 poses with one of the 22 flash lights), yielded 94.6% correct identification with the MFF algorithm and 94.2% with the SNO algorithm [4, Table 2]. More information about these experiments is available in [4]. To sum up, the identification performances of both algorithms are similar, however, the efficiency of MFF is substantially improved, owing to the fact that the cost function is smoother and a stochastic optimization is not required.

In a single image the only information about depth normally consists in information about the shading and the shadow. However using this information requires the illumination environment and the texture of the object to be known. As this information is normally not known, the problem is ill-posed. One way to solve this problem is to use prior knowledge. Therefore, texture and shape PCA models are employed to constraint the set of possible solutions. A lighting model is also used, the Phong reflectance model, which has a few parameters when only one light source is handled. However, even applying this prior models is not enough to obtain an accurate estimate of the 3D shape when just a few manually set anchor points are used as input. This is because the cost function to be minimised is highly non-convex and exhibits many local minima. In fact, the shape model requires the correspondence between the input image and the reference frame to be found. Using e.g. only facial colour information to recover the correspondence is not optimal and may be trapped in regions that present similar intensity variations (eyes/eyebrows, for instance). Other features could be used to obtain a more accurate estimate of the correspondence and, as a result, of the 3D shape. One example of such features are edges. Other features that improve the shape and texture estimate are the specular highlights and the texture constraints. The specular highlight feature uses the specular highlight location, detected on the input image, to refine the normals and, thereby, the 3D shape of the vertices affected (see FIG. 9). The texture constraint enforces the estimated texture to lye within a specific range, which improves the illumination estimate (see FIG. 10).

To avoid getting trapped in local minima, the SNO algorithm used a stochastic optimization that introduced a random error on the derivative of the cost function. This is performed by sampling the cost function at a very small number of points (40 pixels). This random error enables the algorithm to escape from local minima. On the other hand, the MFF algorithm, presented herein, has a smoother cost function owing to the various sources of information used. Hence, it is not required to use a stochastic optimization algorithm and the pixel intensity feature may be safely sampled at many more points providing a more stable parameter update. Hence, much less iteration is needed to reach convergence (a few tens instead of several thousands in the case of SNO). As a result, as well as being accurate, MFF is also more efficient than SNO.

A suitable 2D image of a 3D object can be retrieved by an appropriate digital or analogue image capturing means such as a camera or scanner. It is important that the image capturing means to provide the 2D image in digital form has an appropriate pixel resolution. The physical resolution of the sensor to capture the 2D image is therefore relevant. Nowadays in general a charge-coupled device (CCD) is used as a sensor to record an appropriate image. The CCD contains a grid of pixels and is typically used in digital cameras, optical scanners and video cameras as light-sensing devices. The pixels commonly respond to 70% of the incident light making them more efficient than photographic film, which captures only about 2% of the incident light. An image is projected by a lens on the capacitor array, causing each capacitor to accumulate an electric charge proportional to the light intensity at that location. A one-dimensional array, used in line-scan cameras, captures a single slice of the image, while a two-dimensional array, used in video and still cameras, captures the whole image or a rectangular portion of it. Once the array has been exposed to the image, a control circuit causes each capacitor to transfer its contents to its neighbour. The last capacitor in the array dumps its charge into an amplifier that converts the charge into a voltage. By repeating this process, the control circuit converts the entire contents of the array to a varying voltage, which it samples, digitises and stores in a memory means. Stored 2D images can be then transferred to a data processing device to which performs the steps of a procedure according to the present invention.

After the 3D model of the 3D object has been retrieved by information from the 2D image the 3D model can be used for several purposes such as making of printouts showing the model of the 3D object in any desired direction. Making of a 3D model of the 3D object by a 3D printer, e.g. by feeding liquid into a jetting head which squirts tiny droplets to form a layer of the model. Displaying the 3D model on a displaying device. The present invention offers the opportunity to manufacture 3D models e.g. of persons or object wherefrom only a 2D image is available.

The following more detailed description of the Figures will provide further insights into the present invention.

Figure 1:
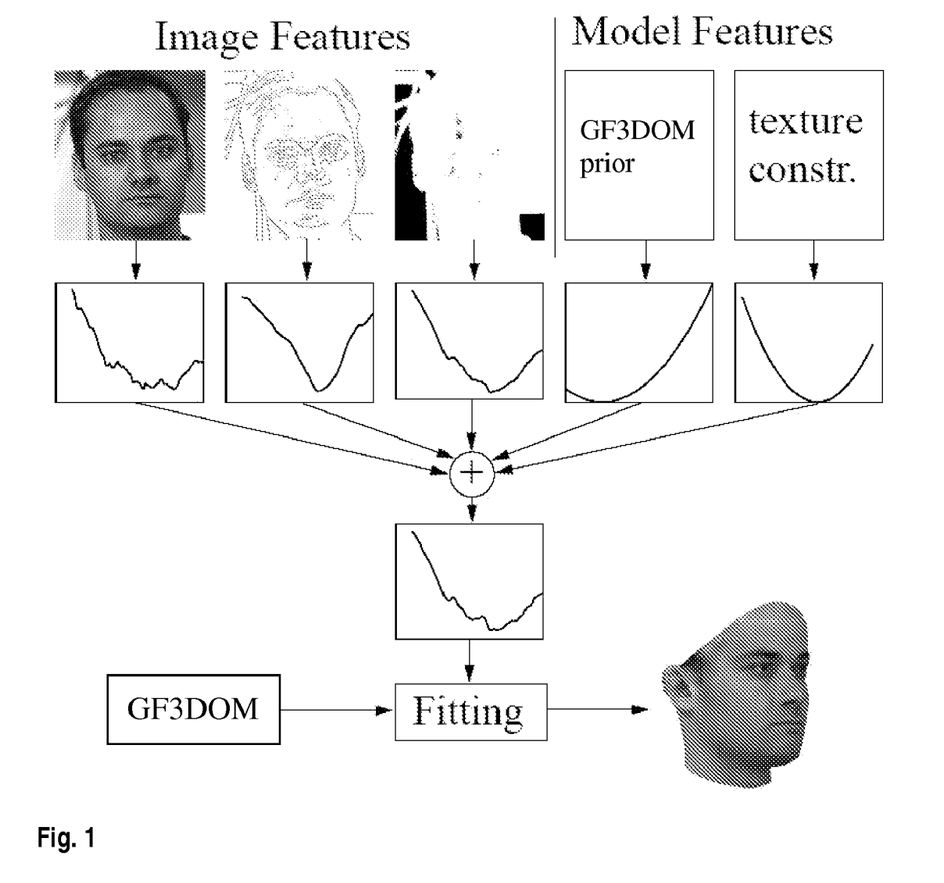
FIG. 1 shows an estimation of texture and imaging parameters of a 3D Shape.

FIG. 1 shows a 3D shape in different styles. In the first row, first picture on the left side shows a texture of the 3D shape, the second picture from the left side in the first row shows the edges of the 3D shape. The middle picture in the first row shows the distribution of specular highlights of the 3D shape. All characteristics have been retrieved from an appropriate input image.

Additionally, two model-based features are used: the Generalized Flexible 3D Object Model (GF3DOM), schematically displayed in the first row, second picture from the right side, and texture constraints.

In the second row plots of each feature cost function along the azimuth angle are shown. As schematically displayed, these cost functions are combined yielding a smoother function that the one based on pixel intensity alone.

Figure 2:
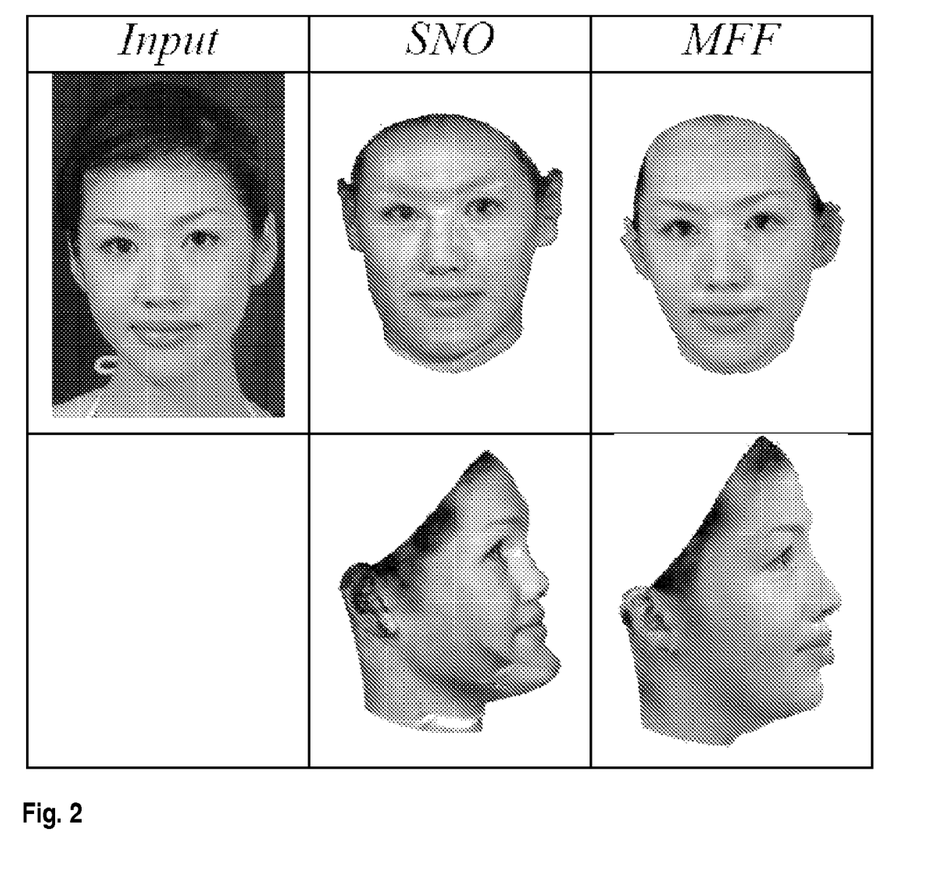
FIG. 2 shows an example of a fitting based on a stochastic Newton Optimisation algorithm.

FIG. 2 shows an example of poor fitting yielded by the Stochastic Newton Optimisation algorithm. Top row: fitting results with the SNO algorithm and with the algorithm presented herein using as input the photograph on the left. Bottom row: Novel view of the fitting result of the top row.

The second column on this figure shows the fitting results obtained with the SNO algorithm and a profile view synthesized using the recovered shape and the texture extracted from the input image. It is apparent on this rendering that the eyebrows are not properly recovered due to a lack of correspondence between the input image and the model. It is also clear that the contour is not accurately fitted as some of the background is visible on the extracted texture (bottom row). These artefacts are not present on the face estimated using the Multi-Feature Fitting (MFF) algorithm presented herein (third column).

Figure 3:
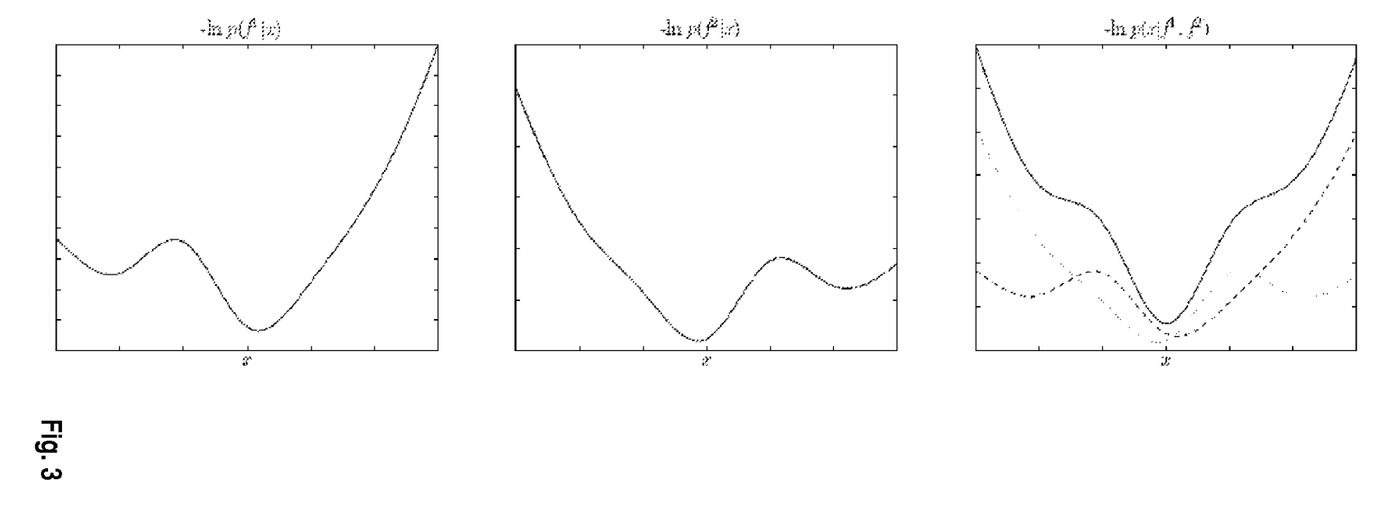
FIG. 3 depicts several cost functions.

FIG. 3 shows an example of two single feature cost functions with each comprising two minima (left and middle plot). The plot on the right hand side shows an example for a multiple feature cost function (plain line) with one global minimum yielded by the addition of the two weak cost functions (dashed lines).

If there is a local minimum that is persistent across all features, then it would persist in the combined cost function. If the features are independent, this is not likely to happen. To make this even less likely to happen, a good strategy is to use as many features as possible.

Figure 4:
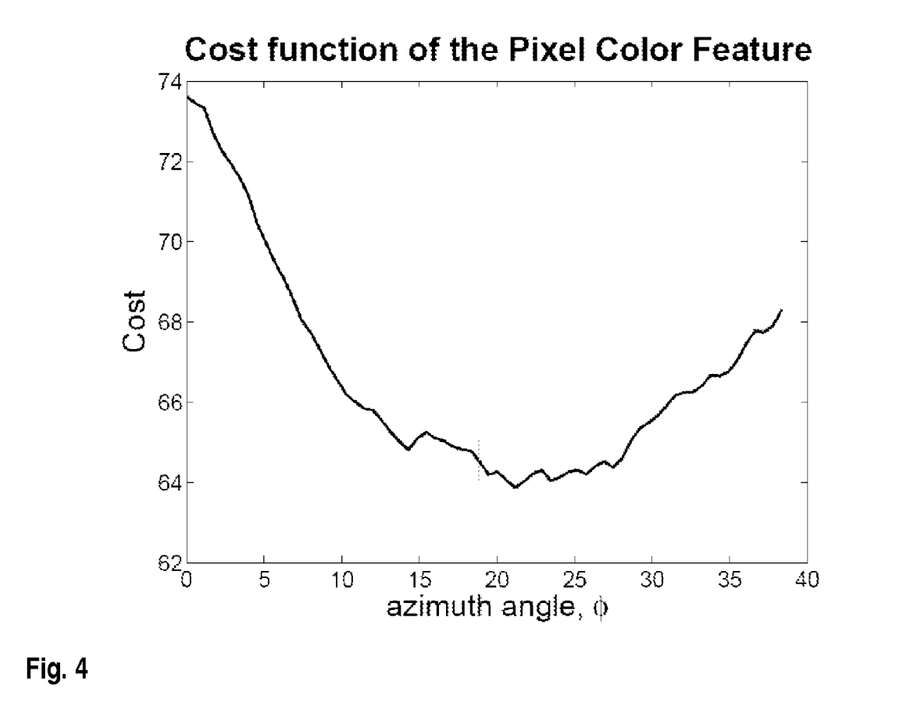
FIG. 4 is a plot of a pixel intensity cost function.

FIG. 4 shows an exemplary plot of a pixel intensity cost function along variations of the azimuth angle of ±20° around the optimum.

Figure 5:
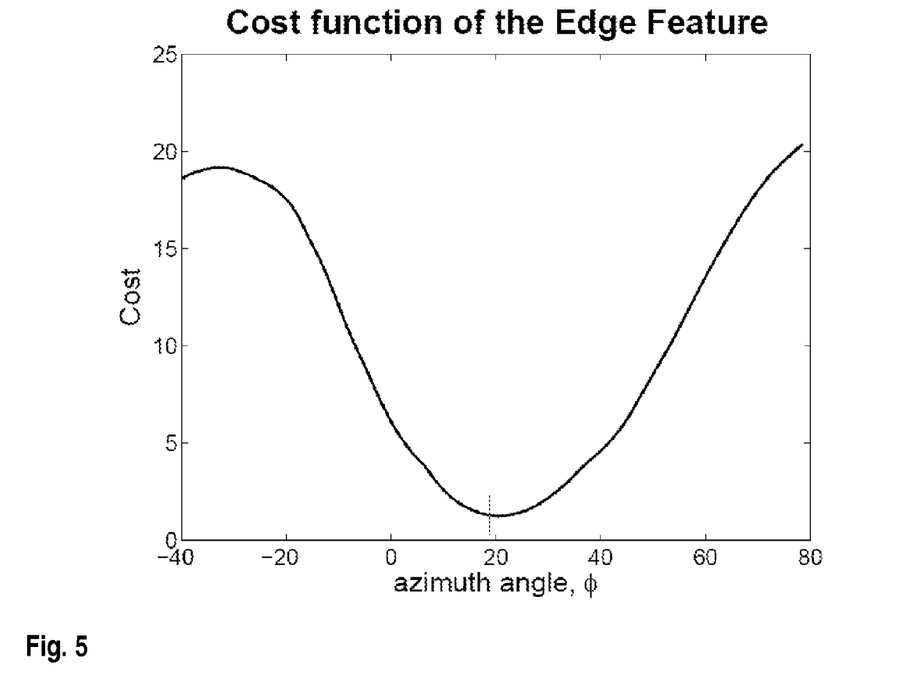
FIG. 5 is a plot of an edge cost function.

FIG. 5 shows a plot of an edge cost function along variations of the azimuth angle of ±60° around the optimum.

Figure 6:
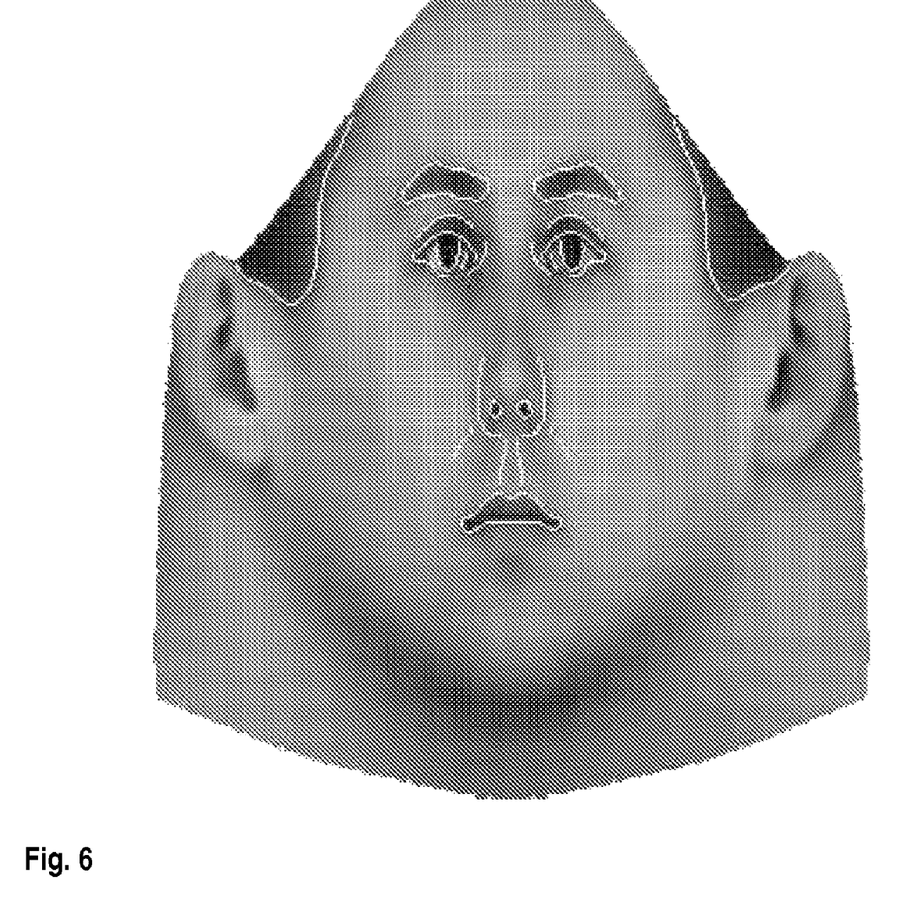
FIG. 6 depicts texture edges on a face.

FIG. 6 shows an unwinded picture of a human face in a textured manner. Textured edges on a face surface are shown as white lines on the texture map of the average head.

FIG. 7 schematically shows rendering of an image yielded in four steps: rendering of the algorithm computing the model contour, when applied to the 'Model image' shown in the upper left part of the figure.

Figure 8:
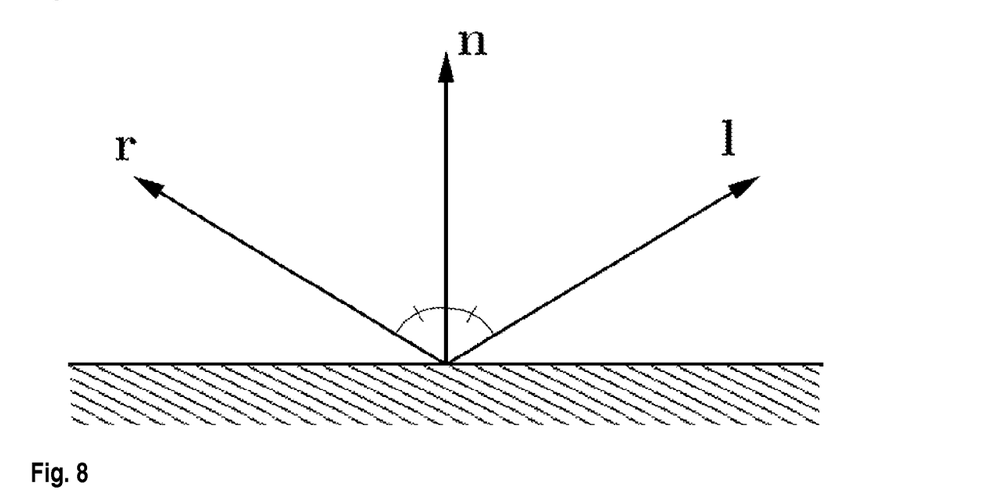
FIG. 8 depicts the reflection of a light vector.

FIG. 8 shows a light vector I as reflected with respect to a surface normal n along a reflection vector r.

FIG. 9 shows a comparison of fitting results with and without specular highlight feature. The photographs are showing: (a) An input photograph; (b) Fitting result of the input photograph without specular highlight feature; (c) Fitting result of the input photograph using the specular highlight feature. (d) Contour of the fitting result according to photograph (b) at a profile view rendered on top of a profile photograph of the same person. (e) Contour of the fitting result (c) at a profile view.

FIG. 10 shows a comparison of fitting results with and without the texture constraint feature. The photographs are showing: (a) An input photograph; (b) and (c) rendering of the fitting result obtained without and with the texture constraint feature; (d) and (e) inverse illuminated extracted texture obtained from the fitting results shown in images (b) and (c), respectively.

Figure 11:
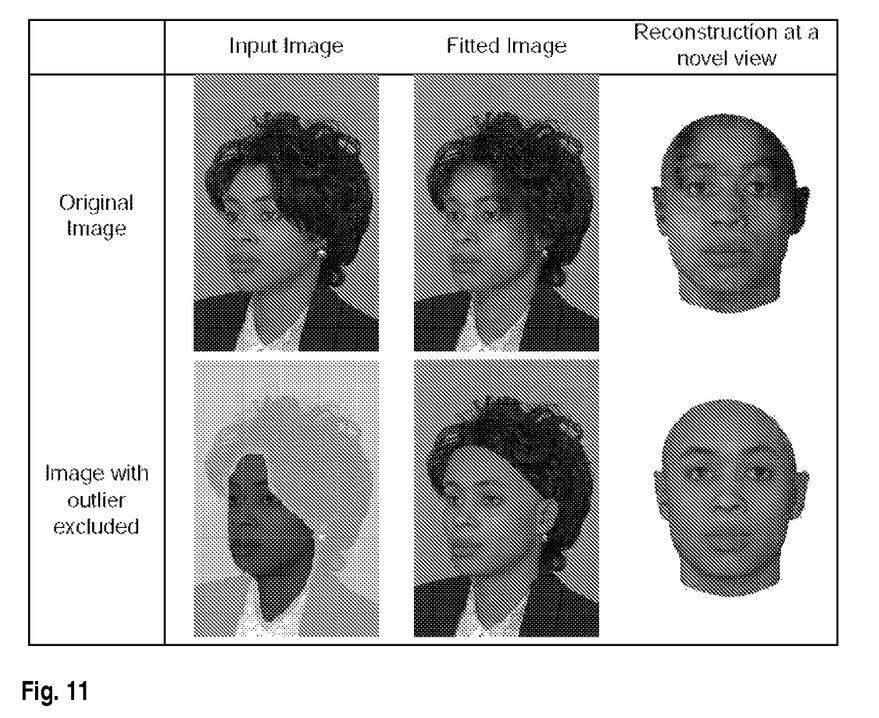
FIG. 11 is an example of the benefit of excluding the outlier part of a face image.

FIG. 11 shows an example of the benefit of excluding the outlier part of a face image. Top row: The second image (middle) is a rendering of the fitting result obtained by fitting the first image. The right image is a rendering of the same fitting result at a frontal pose. Bottom row: The first image is the input image with the outlier region shown in bright. This region was excluded to produce the fitting shown on the second image. The third image is a rendering of this fitting result at a frontal pose.

Figure 12:
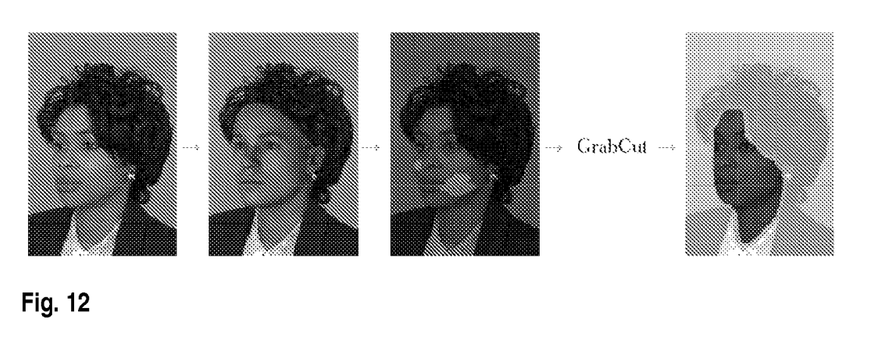
FIG. 12 depicts a generation of an outlier mask.

FIG. 12 schematically shows the automatic generation of an outlier mask. The outlier mask is produced by first performing a coarse fitting (second image) of the input image (first image). Then the position of the five image patches is retrieved (third image). The outlier mask is obtained by applying GrabCut using as foreground the five image patches selected.

LIST OF REFERENCES

[1] P. Belhumeur and D. Kriegman; What is the set of images of an object under all possible illumination conditions; Int. J. Computer Vision, 28(3):245-260, 1998.

[2] P. J. Besl and N. D. McKay; A method for registration of 3d shapes; IEEE Trans. Pattern Anal. Mach. Intell., 14(2): 239-256, 1992.

[3] V. Blanz and T. Vetter; A morphable model for the synthesis of 3D-faces; In SIGGRAPH 99, 1999.

[4] V. Blanz and T. Vetter; Face recognition based on fitting of a 3D morphable model; IEEE Trans. Pattern Anal. Mach. Intell., 2003.

[5] G. Borgefors; Hierarchical chamfer matching: A parametric edge matching algorithm; IEEE Trans. Pattern Anal. Mach. Intell., 10(6): 849-865, 1988.

[6] J. Canny; A computational approach to edge detection; IEEE Trans. Pattern Anal. Mach. Intell., 8(6), 1986.

[7] P. Felzenszwalb and D. Huttenlocher; Distance transforms of sampled functions; Technical Report TR2004-1963, Cornell Computing and Information Science, 2004.

[8] A. Fitzgibbon; Robust registration of 2d and 3d point sets; In Proc. British Machine Vision Conference, volume 2, pages 411-420, 2001.

[9] W. H. Press, S. A. Teukolsky, W. T. Vetterling, B. P. Flannery; Numerical recipes in C: the art of scientific computing; Cambridge University Press, 1992.
[10] J. Schürmann; Pattern classification: a unified view of statistical and neural approaches; John Wiley & Sons, Inc., 1996.
[11] A. Shashua; On photometric issues in 3d visual recognition from a single 2d image. Int. J. Computer Vision; 21:99-122, 1997.
[12] T. Sim, S. Baker, and M. Bsat; The cmu pose, illumination and expression (pie) database of human faces; Technical report, CMU, 2000.
[13] T. Vetter and T. Poggio; Linear object classes and image synthesis from a single example image; IEEE Trans. Pattern Anal. Mach. Intell., 1997.
[14] J. Xiao, S. Baker, I. Matthews, R. Gross, and T. Kanade; Real-time combined 2d+3d active appearance model; In Proceedings IEEE Conf. on Computer Vision and Pattern Recognition, pages 535-542, 2004.
[15] Estimating Coloured 3D Face Models from Single Images: An Example Based Approach, Vetter, T. and Blanz, V. Proceedings: Computer Vision ECCV'98—Freiburg, Germany, pp499-513, Springer, LNCS 1407.
[16] Efficient, Robust and Accurate Fitting of a 3D Morphable Model Sami Romdhani and Thomas Vetter Proceedings of the IEEE International Conference on Computer Vision 2003.
[17] C. Rother, V. Kolmogorov, and A. Blake. Grabcut—interactive foreground extraction using iterated graph cuts. Proc. ACM Siggraph, 2004.

What is claimed is:

1. A method for estimation of object properties of a 3-dimensional object from a 2-dimensional image by recovering model parameters to adjust a 3-dimensional model of the 3-dimensional object from the 2-dimensional image by a Multi-Feature Fitting Algorithm comprising the following steps:
   a) retrieving several image related informations from the 2-dimensional image;
   b) processing retrieved informations separately by specific cost functions;
   c) superimposing results of specific cost functions in the Multi-Feature Fitting Algorithm;
   d) approaching a global extreme of Multi-Feature Cost Function by adjusting model parameters related to the Multi-Feature Fitting Algorithm;
   e) using the model parameters in the 3-dimensional model to display a 3-dimensional estimation of a 3-dimensional shape.

2. The method according to claim 1 wherein the 3-dimensional model is a 3- dimensional Generalized Flexible 3D Object Model (GF3DOM).

3. The method according to claim 2 wherein the Multi-Feature Fitting Algorithm comprises a linear combination of cost functions.

4. The method according to claim 3 wherein the Multi-Feature Fitting Algorithm complies with the following formula:

$$\min_\theta \tau^c C^c + \tau^e C^e + \tau^s C^s + \tau^p C^p + \tau^t C^t.$$

5. The method according to claim 2 wherein information about pixel intensity is used in a pixel intensity cost function.

6. The method according to claim 5 wherein the pixel intensity cost function complies with following formula:

$$C^c = \sum_{i \in Inlier} (I(x, y) \circ p(u_i, v_i; \theta) - t^c(u_i, v_i; \theta))^2.$$

7. The method according to claim 2 wherein a generation of an outlier mask comprises the following steps:
   a) performing a coarse fitting without outlier mask, but with a large weight on a prior probability by at least one iteration of the fitting algorithm to provide a rough estimation of pose and shape of the 3D object;
   b) selecting of at least one image patches in an input image area, whereby the image patches are located at constant positions in the GF3DOM, and using correspondences determined by the coarse fitting result to determine position of these patches in the input image;
   c) executing a Grab Cut Algorithm to segment relevant and non-relevant regions, thereby producing the outlier mask.

8. The method according to claim 2 wherein information about edge features is used in an edge feature cost function.

9. The method according to claim 8 wherein the edge feature cost function complies with following formula:

$$C^e = \frac{1}{2} \sum_{i \in Edge} (q^e_{k(i)} - p_i(\theta))^2.$$

10. The method according to claim 2 wherein information about the texture constraint is used in a texture constraint cost function.

11. The method according to claim 10 wherein the texture constraint cost function complies with following formula:

$$C^t = \frac{1}{2} e^{tT} \cdot e^t.$$

12. The method according to claim 2 wherein information about specular highlight is used in a specular highlight cost function.

13. The method according to claim 12 wherein the specular highlight cost function complies with following formula: $C^s = e^{sT} \cdot e^s$.

14. A method in a data processing system for the estimation of object properties of a 3-dimensional object, wherein said data processing system includes a COD-array, a display and an operating system, said method comprising the steps according to claim 2.

15. A computer program element comprising a computer program code means encoded on a computer-readable medium to make the computer execute the method according to claim 2.

16. A data processing system for estimation of object properties of a 3-dimensional object, wherein said data processing system includes a display and an operating system, said data processing system comprising means to execute the method according to claim 2.

17. The method according to claim 1 wherein the Multi-Feature Fitting Algorithm comprises a linear combination of cost functions.

18. The method according to claim 17 wherein the Multi-Feature Fitting Algorithm complies with the following formula:

$$\min_{\theta} \tau^c C^c + \tau^e C^e + \tau^s C^s + \tau^p C^p + \tau^t C^t.$$

19. The method according to claim 1 wherein information about pixel intensity is used in a pixel intensity cost function.

20. The method according to claim 19 wherein the pixel intensity cost function complies with following formula:

$$C^c = \sum_{i \in Inlier} (I(x, y) \cdot p(u_i, v_i; \theta) - t^c(u_i, v_i; \theta))^2.$$

21. The method according to claim 1 wherein a generation of an outlier mask comprises the following steps:
   a) performing a coarse fitting without outlier mask, but with a large weight on a prior probability by at least one iteration of the fitting algorithm to provide a rough estimation of pose and shape of the 3D object;
   b) selecting of at least one image patches in an input image area, whereby the image patches are located at constant positions in a GF3DOM, and using correspondences determined by the coarse fitting result to determine position of these patches in the input image;
   c) executing a Grab Cut Algorithm to segment relevant and non-relevant regions, thereby producing the outlier mask.

22. The method according to claim 1 wherein information about edge features is used in an edge feature cost function.

23. The method according to claim 22 wherein the edge feature cost function complies with following formula:

$$C^e = \frac{1}{2} \sum_{i \in Edge} (q^e_{k(i)} - p_i(\theta))^2.$$

24. The method according to claim 1 wherein information about the texture constraint is used in a texture constraint cost function.

25. The method according to claim 24 wherein the texture constraint cost function complies with following formula:

$$C^t = \frac{1}{2} e^{tT} \cdot e^t.$$

26. The method according to claim 1 wherein information about specular highlight is used in a specular highlight cost function.

27. The method according to claim 26 wherein the specular highlight cost function complies with following formula: $C^s = e^{sT} \cdot e^s$.

28. A method in a data processing system for the estimation of object properties of a 3-dimensional object, wherein said data processing system includes a CCD-array, a display and an operating system, said method comprising the steps according to claim 1.

29. A computer program element comprising a computer program code means encoded on a computer-readable medium to make the computer execute the method according to claim 1.

30. A data processing system for estimation of object properties of a 3-dimensional object, wherein said data processing system includes a display and an operating system, said data processing system comprising means to execute the method according to claim 1.

* * * * *